United States Patent
Zimmerly

Patent Number: 6,073,969
Date of Patent: Jun. 13, 2000

[54] PIPE CONNECTION FOR PIPES HAVING DISSIMILAR END FERRULES

[75] Inventor: Robert D Zimmerly, Kenosha, Wis.

[73] Assignee: Tri-Clover, Inc., Kenosha, Wis.

[21] Appl. No.: 09/054,327

[22] Filed: Apr. 2, 1998

[51] Int. Cl.[7] .................................................. F16L 17/06
[52] U.S. Cl. .......................... 285/12; 285/336; 285/910; 277/614
[58] Field of Search ............................... 285/12, 349, 350, 285/336, 337, 363, 364, 910, 148.27, FOR 160; D23/269; 29/401.1; 277/602, 608, 614, 616, 626

[56] References Cited

U.S. PATENT DOCUMENTS

| | | | |
|---|---|---|---|
| 101,488 | 4/1870 | Mendham | 277/614 |
| 508,765 | 11/1893 | Rouse | 277/614 |
| 2,070,291 | 2/1937 | McHugh | 277/614 X |
| 2,407,076 | 9/1946 | Harkness | 277/614 X |
| 2,780,483 | 2/1957 | Kessler . | |
| 2,789,844 | 4/1957 | Kessler . | |
| 5,749,586 | 5/1998 | Abe et al. | 277/608 |

FOREIGN PATENT DOCUMENTS

| | | | |
|---|---|---|---|
| 716079 | 1/1942 | Germany | 285/336 |

*Primary Examiner*—Lynne H. Browne
*Assistant Examiner*—Greg Binda
*Attorney, Agent, or Firm*—Ryan Kromholz & Manion, S.C.

[57] ABSTRACT

A gasket is provided for joining lengths of pipe having dissimilar end faces which are of approximately equal diameters and which are substantially normal to the longitudinal axis of the pipes. The end faces each include a circular recess which are of differing diameters. The gasket has a first side which has a surface contour which is a mirror image of one of the faces and the opposite side has a surface contour which is a mirror image of the other end face. The outer periphery of said gasket is of a substantially lesser thickness than its inner marginal portion so that compression during use of the thicker inner marginal portion is minimized.

3 Claims, 3 Drawing Sheets

PIPE CONNECTION FOR PIPES HAVING DISSIMILAR END FERRULES

BACKGROUND OF THE INVENTION

The present invention relates to end-to-end abutting connection of fluid handling pipes. More particularly, the invention relates to a pipe connection adapted for end-to-end connection of pipes having dissimilar ferrules welded to the ends thereof, or which otherwise have dissimilar ends.

Heretofore, pipes, for example, those used for conveying liquids or flowable food products have often been connected together by attaching abutting flanges to the ends of the pipes. In order to attach such flanges it has been common to manufacture a ferrule having a flange, which ferrule has, at its opposite end, a section having a diameter equal to that of the pipe and is thus adapted to be welded to an end of the pipe. Often it is desired to form an end-to-end connection between pipes having dissimilar end fittings.

For example, flanges are often provided with grooves in the abutting face surfaces for retention therein of a gasket, in order to ensure a leakproof connection of the two abutting pipe sections. However, to avoid compression and extrusion inwardly into the pipe of the gasket material, to avoid partial obstruction of fluid flow in the pipe, ferrules are sometimes provided with end surfaces which use metal-to-metal abutment to avoid excessive compression of a gasket fitted between the end surfaces, as shown in my co-pending application Ser. No. 053,962 filed on even date herewith. It has been difficult, however, to effectively connect the ends of pipes adapted for such metal-to-metal abutment with older style pipes which do not. One technique has been to construct a short spool which fits between the two dissimilar ends. This, however has proved to be so costly as to be impractical.

Additionally, a further problem occurs due to the fact that when a gasket is inserted between metal ferrules and the joint secured in place, unwanted extrusion of the gasket material may occur. Thus a need has existed for improved gasket configurations which overcome these shortcomings.

SUMMARY OF THE INVENTION

It is an important object of the present invention to provide gaskets having a novel configuration for joining abutting flanges used for connecting fluid flow pipes in a leakproof end-to-end connection. Another important object of the invention is to provide such gaskets which minimize inward extrusion of the gasket material when abutting flange faces are clamped in place joining the pipe sections.

A yet further aspect of the invention relates to provision of a novel gasket which enables connection of a pipe section which is provided with an end ferrule which provides for metal-to metal contact to a pipe having a prior art end ferrule.

Briefly, the invention provides a gasket for joining lengths of pipe having dissimilar end faces which are of approximately equal diameters and which are substantially normal to the longitudinal axis of the pipes. The end faces each include a circular recess which are of differing diameters. The gasket has a first side which has a surface contour which is a mirror image of one of the faces and the opposite side has a surface contour which is a mirror image of the other end face. An improved joint is thus formed. A related aspect involves joining of such dissimilar end faces using a gasket having an outer periphery which has a thin cross section and an inner periphery which has a relatively thick cross section. The relatively thin outer periphery is found to limit the compression of the gasket, thus substantially minimizing the tendency of the gasket to extrude inwardly.

Further objects and advantages of the invention will become apparent from the following detailed description, the appended claims, and the accompanying drawings.

DETAILED DESCRIPTION OF THE PREFERRED EMBODIMENT

Figure 1:
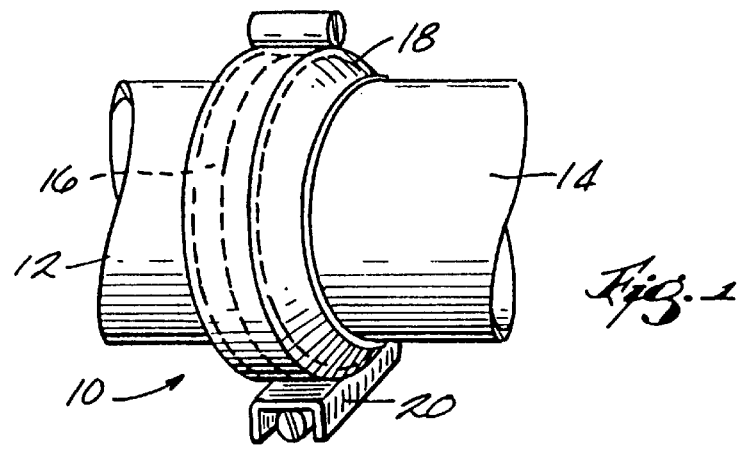
FIG. 1 is a fragmentary perspective view of a flange type pipe connection of the present invention.

Referring more specifically to the drawings, there is seen in FIG. 1 a pipe connection 10 connecting pipe sections 12 and 14 which are illustrated in fragmentary fashion. Pipe end flanges 16 and 18 are clamped together by a clamp 20 which may either be a fixed clamp or, alternatively, a type which can be pivoted open, as is known in the art.

Figure 2:
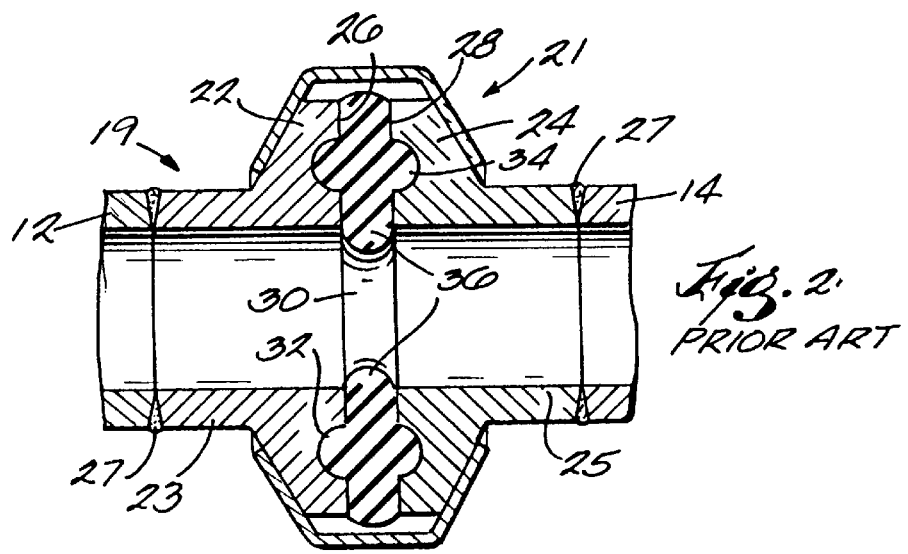
FIG. 2 is a fragmentary central cross-sectional view of a joint between pipes in accordance with the prior art.

FIG. 2 illustrates a prior art type of flange connection arrangement of the prior art which has various shortcomings. In this prior art configuration, ferrules 19 and 21 are provided with flanges 22 and 24 which are integral with sections 23 and 25, respectively. Sections 23 and 25 have the same diameters as pipes 12 and 14. The ferrule ends 23 and 25 are attached by welds 27 to the respective pipe sections 12 and 14. Flanges 22 and 24 have end surfaces 26 and 28 which face each other. These surfaces 26 and 28, are formed perpendicular or normal to the central axis of the pipes 12 and 14. A gasket 30 extends across the entire surface of faces 26 and 28. To retain gasket 30 in place, the facing surfaces 26 and 28 are each provided with a groove 32 and 34, respectively. Grooves 32 and 34 may be semi-circular, elliptical, etc. in cross section.

As seen in FIG. 2, when the flanges 22 and 24 are clamped together, the inward pressure on gasket 30 may cause the inner surface 36 to be extruded into the interior of the pipe connection as shown. This results in a flow conduit having an undesired restriction in the vicinity of gasket 30.

Figure 3:
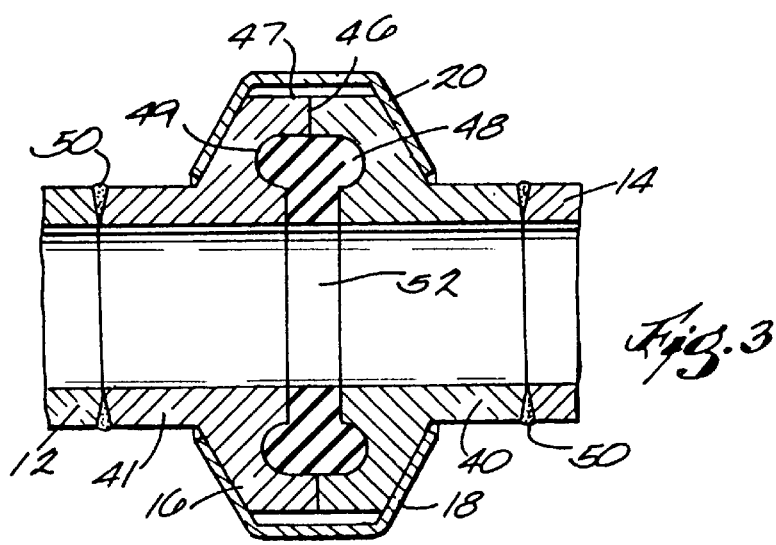
FIG. 3 is a sectional view taken along line 3—3 of FIG. 1 showing pipe end using a metal-to-metal connection.

Ferrule 40 is shown in FIG. 3 after it has been attached to pipe 14 by means of a weld 50. Similarly, another ferrule 41 has been welded to another pipe 12 by means of a weld 50. Pipes 12 and 14 are then adapted to be attached together by flanges 16 and 18 which are held in place by a clamp 20. Ferrule 41 includes an abutting face 47 and a gasket retaining groove 49 identical to those of ferrule 40.

As seen in FIG. 3, the faces 46 and 47 are perpendicular to the axes of pipes 12 and 14. Due to the fact that faces 46 and 47 are perpendicular to the axis, and thus parallel to each other, they can be used to abut each other as seen in FIG. 3. This enables the use of a gasket 52 which fits into the groove defined on opposite sides by indentations 48 and 49. Then, due to the fact that faces 46 and 47 act as a stop, the gasket 52 is subjected to controlled compression. This results in avoidance of extrusion of the gasket 52 into the interior of the conduit formed by the joining of pipes 12 and 14.

Figure 4:
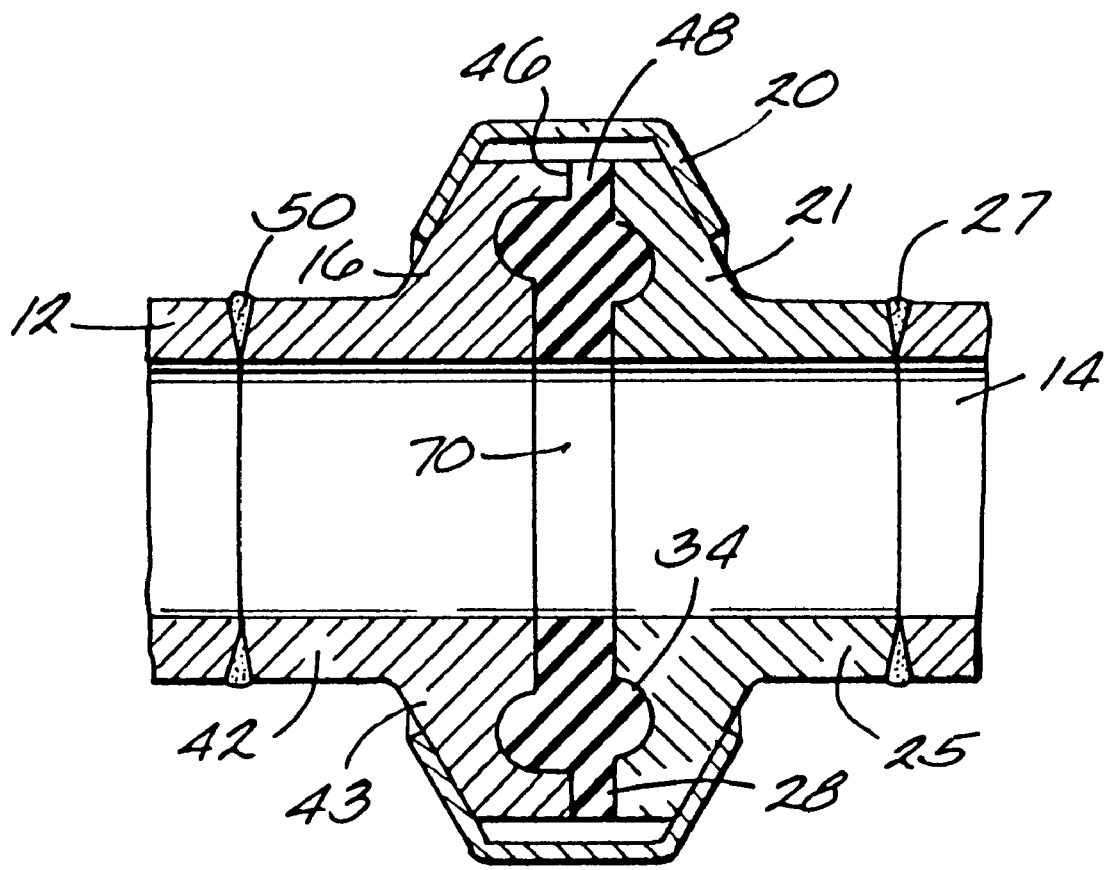
FIG. 4 is a fragmentary central cross-sectional view taken along line 4—4 of FIG. 1 of a joint between a pipe having an end fitting of this invention with a pipe which has a prior art end fitting and showing a novel gasket of this invention and, FIG. 5 is a fragmentary central cross-sectional view of a joint between a pipe having an end fitting of this invention with a pipe which has a prior art end fitting and showing an alternative embodiment to that shown in FIG. 4.

FIG. 4 illustrates the joining, in a novel way, of a section of pipe 12, terminated by a ferrule 42, with another section of pipe 14 terminated by a prior art ferrule of the type shown in FIG. 2. Such joints are used in instances where it is desired to connect dissimilar pipe end surfaces such as connection of a pipe ending shown in FIG. 3 to existing pipes of an installation which has previously been provided with fittings of the prior art of the type of FIG. 2. In order to accommodate such connection, a novel gasket 70 of this invention is used. Gasket 70 is asymmetric through its central plane such that the left half of gasket 70 viewed in FIG. 4 is identical to one-half of gasket 52 illustrated in FIG. 3. The other half of gasket 70 is identical to gasket 30 as seen in FIG. 2. By means of the use of this asymmetric gasket 70, a leakproof joint is formed connecting the two dissimilar pipe sections.

The first end face 46 has thereon a circular recess 48 of a first outer diameter. The second end face 28 has a recess 34 thereon which has a second outer diameter different than the first outer diameter. Even though there is no metal-to-metal contact to serve as a stop, undue inward extrusion of the gasket 70 is accomplished, in accordance with the invention by providing an inner gasket marginal portion 74 of a first thickness adapted to seal the joint and an outer flange portion 72 of a substantially lesser thickness. The outer flange portion 72 of substantially lesser thickness, being much less compressible than the thicker marginal portion 74, serves to act as a stop, preventing unwanted compression of the thicker marginal portion. For example, in a practical embodiment, portion 74 may have a thickness of 0.084 inch while portion 72 has a thickness of 0.039 inch. These dimensions have been found to work effectively to prevent excessive compression of portion 74 in use.

Figure 5:
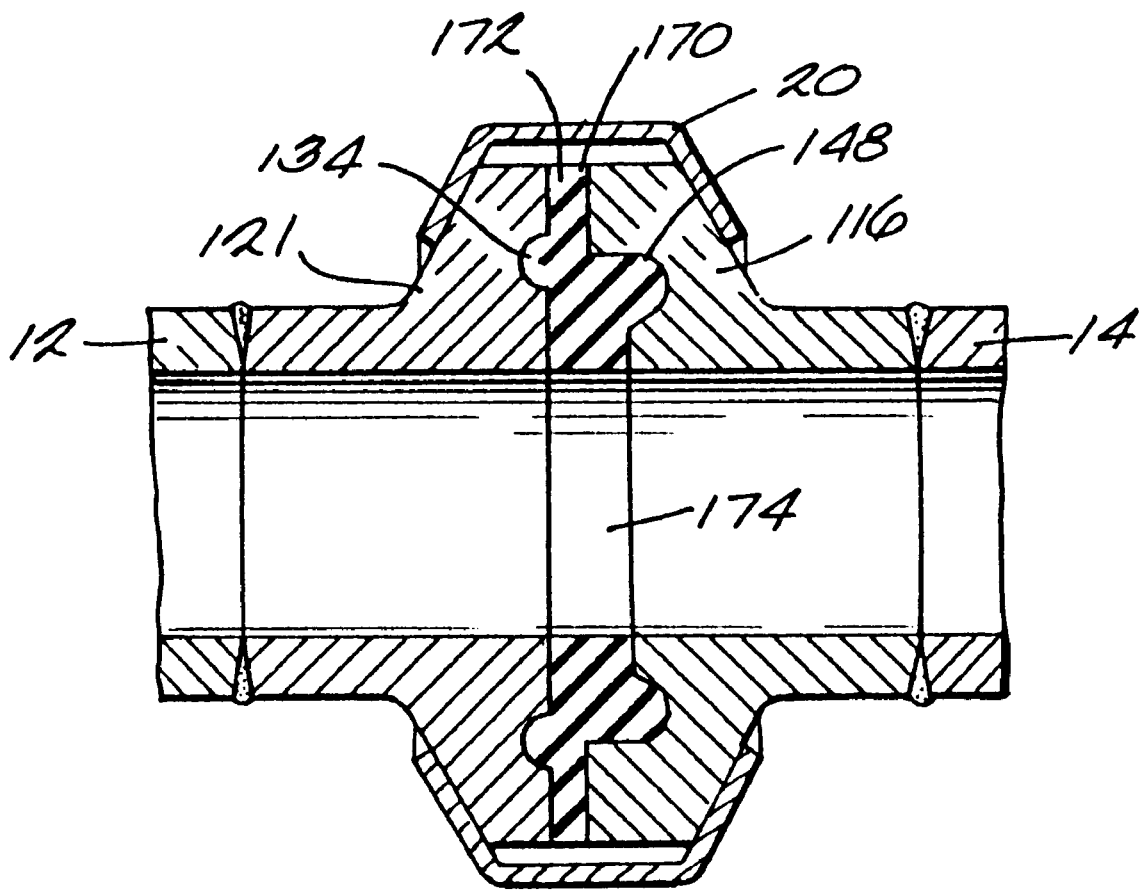

FIG. 5 illustrates another, commercially preferred embodiment which is alternative to that shown in FIG. 4. Here, a prior art style pipe section 12, terminated by a ferrule 121 is joined to another section of pipe 14 terminated by a ferrule 116. This arrangement also connects dissimilar pipe end surfaces such as connection of a pipe ending shown in FIG. 3 to existing pipes of an installation which has previously been provided with fittings of the prior art of the type of FIG. 2. In this case gasket 170 of this invention is used. Gasket 170 is asymmetric through its central plane such that the left half of gasket 170 is a mirror image of the end of the face of ferrule 121 and the other half of gasket 170 is a mirror image of the face of ferrule end 166. By means of the use of this asymmetric gasket 170, a leakproof joint is also formed connecting the two dissimilar pipe sections.

The left end face in FIG. 5 has thereon a circular recess 134 of a first outer diameter. The right end face 148 has a recess thereon which has a second outer diameter different than the first outer diameter. Even though there is no metal-to-metal contact to serve as a stop, undue inward extrusion of the gasket 170 is also accomplished, in accordance with the invention by providing an inner gasket marginal portion 174 of a first thickness adapted to seal the joint and an outer flange portion 172 of a substantially lesser thickness. The outer flange portion 172 of substantially lesser thickness, being much less compressible than the thicker marginal portion 174, serves to act as a stop, preventing unwanted compression of the thicker marginal portion.

Gaskets 70 or 170 can be formed of polytetrafluoroethylene or a suitable elastomer such as natural rubber, silicone elastomer, neoprene rubber, or butadiene copolymer.

I claim:

1. In combination, first and second lengths of pipe joined together by a joint connection which includes a gasket for joining said first length of pipe having a first end face with said second length of pipe of equal diameter but having a second end face which is dissimilar to said end face of said first length of pipe, said first and second end faces being of approximately equal diameters and being substantially normal to the longitudinal axis of said pipes, said first end face having thereon a circular recess of a first outer diameter, said second end face having a recess thereon which has a second outer diameter different than said first outer diameter, said gasket having a first side which has a surface contour which is a mirror image of said first end face and, a second side opposite said first side which has a surface contour which is a mirror image of said second end face, said gasket having an outer periphery with a first thickness, said outer periphery having an inner diameter greater than that of the greater of said first and second outer diameters, said gasket having an inner marginal portion with a second thickness substantially greater than said first thickness whereby compression during use of said inner marginal portion is minimized.

2. A gasket according to claim 1 comprising an elastomer selected from the group consisting of natural rubber, silicone elastomer, neoprene rubber, and butadiene copolymer.

3. A gasket according to claim 1 which comprises polytetrafluoroethylene.

* * * * *